US009369823B2

(12) United States Patent
Dharawat et al.

(10) Patent No.: US 9,369,823 B2
(45) Date of Patent: Jun. 14, 2016

(54) SYSTEM AND METHOD FOR TRANSFERRING SOFTWARE APPLICATIONS AND DATA BETWEEN TWO MOBILE DEVICES WITH DIFFERENT OPERATING SYSTEMS

(71) Applicant: MOTOROLA MOBILITY LLC, Libertyville, IL (US)

(72) Inventors: Parikshit Dharawat, Sunnyvale, CA (US); Su-Yin Gan, Sunnyvale, CA (US); Ansuman Tapan Satpathy, Sunnyvale, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/035,134

(22) Filed: Sep. 24, 2013

(65) Prior Publication Data
US 2015/0087288 A1    Mar. 26, 2015

(51) Int. Cl.
*H04M 3/00*   (2006.01)
*H04W 4/00*   (2009.01)
*H04W 76/02*  (2009.01)

(52) U.S. Cl.
CPC .............. *H04W 4/005* (2013.01); *H04W 4/001* (2013.01); *H04W 76/02* (2013.01)

(58) Field of Classification Search
CPC ..... H04W 4/00; H04W 76/02; H04W 76/021; H04W 76/023; H04W 76/025; H04W 76/041; H04W 88/00; H04W 88/02; H04W 8/20; H04W 8/205; H04W 8/22; H04W 8/24; H04W 4/001; H04W 4/003; H04W 4/005

USPC .......... 455/414.1, 418, 419, 420, 556.1, 557, 455/566
See application file for complete search history.

(56) References Cited

U.S. PATENT DOCUMENTS

| | | | |
|---|---|---|---|
| 7,209,466 B2 * | 4/2007 | Cabana .......................... | 370/338 |
| 7,257,386 B1 * | 8/2007 | McDonnell et al. .......... | 455/403 |
| 7,779,409 B2 * | 8/2010 | Persson et al. ................ | 717/178 |
| 8,156,488 B2 * | 4/2012 | Kotamarthi et al. .......... | 717/174 |
| 8,498,641 B2 * | 7/2013 | Mielke et al. ............... | 455/435.1 |
| 8,595,289 B2 * | 11/2013 | Nandlall et al. .............. | 709/203 |
| RE44,746 E * | 2/2014 | Adams et al. ................. | 455/418 |
| 8,694,436 B2 * | 4/2014 | Fisher ............................. | 705/64 |
| 2003/0147369 A1 * | 8/2003 | Singh et al. .................... | 370/338 |
| 2005/0014531 A1 * | 1/2005 | Findikli ........................ | 455/557 |
| 2006/0179079 A1 | 8/2006 | Kolehmainen | |

(Continued)

OTHER PUBLICATIONS

International Search Report and Written Opinion of International Application No. PCT/US2014/020073, mailed Sep. 11, 2014 17 pp.

(Continued)

*Primary Examiner* — Jean Gelin
(74) *Attorney, Agent, or Firm* — Shumaker & Sieffert, P.A.

(57) ABSTRACT

A method, machine and system enable the automated transfer of software applications between mobile devices that have different operating systems. A computer receives a first image of a first display screen of a first mobile device with at least one application (app) selection icon visible within the first image. The computer analyzes the first image to identify at least one software application from the at least one selection icon. The computer initiates a download of the at least one application identified to a second mobile device for installation of the at least one application on the second mobile device.

20 Claims, 11 Drawing Sheets

(56) References Cited

U.S. PATENT DOCUMENTS

2010/0279674 A1* 11/2010 Zou et al. .................. 455/419
2012/0184255 A1    7/2012 Macaluso
2012/0331457 A1   12/2012 Ryu et al.
2013/0185380 A1*  7/2013 Anderson et al. ............ 709/217

OTHER PUBLICATIONS

Invitiation to Pay Additional Fees of International application No. PCT/US2014/020073, mailed Jun. 4, 2014, 5 pp.

International Preliminary Report on Patentability from International Application No. PCT/US2014/020073, mailed Sep. 24, 2015 13 pp.

* cited by examiner

SYSTEM AND METHOD FOR TRANSFERRING SOFTWARE APPLICATIONS AND DATA BETWEEN TWO MOBILE DEVICES WITH DIFFERENT OPERATING SYSTEMS

BACKGROUND

1. Technical Field

The present disclosure generally relates to mobile devices. More specifically, the present disclosure relates to transferring software applications between mobile devices that have different operating systems.

2. Description of the Related Art

Mobile electronic devices such as mobile phones are extremely popular and enjoy wide spread acceptance in our society. Users are able to load various software applications on their mobile devices to enable a wide variety of functions and uses. For example, a social website software application or a weather software application can be downloaded from a server to a mobile device. Each of the software applications is designed to run or execute on a specific operating system that is associated with the mobile device. In addition, mobile devices are used by the operator to store various types of data such as phone numbers, addresses, music and photos.

There are several manufactures of mobile devices and several manufacturers of operating system. Each mobile device is designed to use a specific operating system (OS). A software application designed to run on a first operating system is typically not capable of running on a second different operating system. If a mobile device user decides to switch from one mobile device to another with a different operating system, the user must manually reload all of the software applications and associated data available on their old mobile device to the new mobile device. This procedure is difficult and time consuming. Most applications require a complete download from the application server of the correct version of the application for the new OS. The user therefore has to retrieve a list of applications from the previous device and manually search for a corresponding application to download to the new device. It is desirable to improve the process for a user switching from a current mobile device to another mobile device with a different operating system.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, machine and system for transferring software applications between mobile devices that have different operating systems. A computer receives a first image of a first mobile device display screen with at least one application (app) selection icon visible within the first image. The computer analyzes the first image to identify at least one software application from the at least one selection icon. The computer initiates a download of a correct OS version of the at least one application identified to a second mobile device having a known OS for installation of the at least one application on the second mobile device.

In the following detailed description of exemplary embodiments of the disclosure, specific exemplary embodiments in which the disclosure may be practiced are described in sufficient detail to enable those skilled in the art to practice the disclosure, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

It is understood that the use of specific component, device and/or parameter names (such as those of the executing utility/logic described herein) are for example only and not meant to imply any limitations on the disclosure. The disclosure may thus be implemented with different nomenclature/terminology utilized to describe the components/devices/parameters herein, without limitation. Each term utilized herein is to be given its broadest interpretation given the context in which that term is utilized.

Those of ordinary skill in the art will appreciate that the hardware components and basic configuration depicted in the system figures (e.g., FIGS. 1-4) may vary. The illustrative components within the devices presented by these figures are not intended to be exhaustive, but rather are representative to highlight essential components that can be utilized to implement aspects of the present disclosure. For example, other devices/components may be used in addition to or in place of the hardware depicted. The depicted example is not meant to imply architectural or other limitations with respect to the presently described embodiments and/or the general concepts presented by the disclosure.

Figure 1:
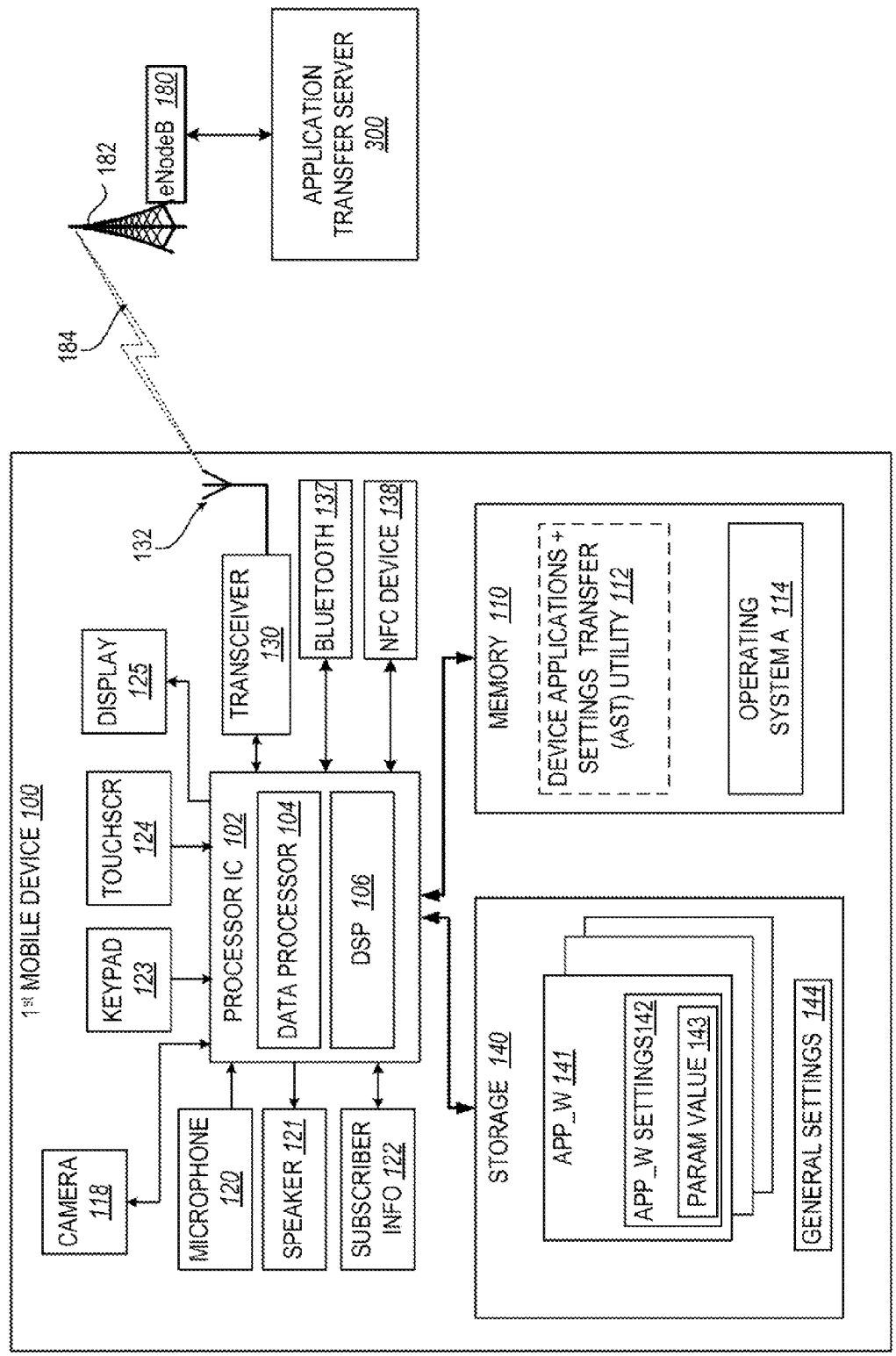
FIG. 1 illustrates a block diagram representation of an example mobile device connected to a application transfer server through a wireless network according to one embodiment.

With reference now to the figures, and beginning with FIG. 1, there is depicted a first mobile device connected to an application transfer server through a wireless network according to an embodiment. First mobile device 100 is communicatively coupled to application transfer server (ATS) 300 via a wireless connection or interface 184 through a base station, represented as an evolution Node B (eNodeB) 180 with a corresponding base station antenna 182. With this embodiment, first mobile device 100 can be one of a wide variety of digital/electronic devices that can communicate via wireless transmission over a wireless network, including devices such as a mobile phone, smartphone, personal digital assistant, tablet computer or other digital device. First mobile device 100 includes a processor integrated circuit (IC) 102 that has a data processor 104 and a digital signal processor (DSP) 106. Processor IC 102 is in communication with memory 110 and storage 140 via a bus or direct connection. Memory 110 is a computer readable storage medium/device that stores data and software programs and code that can be executed on processor IC 102. In one embodiment, memory 110 is a non-volatile memory. Memory 110 can contain device applications and settings transfer (AST) utility 112 and operating system A 114. Mobile device AST utility 112 executes on processor IC 102 to perform various functional processes described herein. Operating system A 114 manages the hardware resources of first mobile device 100 and provides common services for software applications.

Storage 140 is a computer readable storage medium/device that stores data and software programs and code that can be executed on processor IC 102. In one embodiment, storage 140 is a non-volatile memory. Storage 140 includes one or more software applications (APP) 141, an example of which (APP_W) 141 is shown. Storage 140 also contains general settings 144. Software APP_W 141 contains application settings 142 that have an associated parameter value 143. Software applications 141 execute on processor IC 102 to perform various functional processes. In one example embodiment, software applications 141 can cause first mobile device 100 to be linked to and send and receive data from a social networking website. General settings 144 contains data and settings used by more than one software application 141. For example general settings 144 can store a preferred font size and screen resolution.

First mobile device 100 further comprises a camera 118, a microphone 120, a speaker 121, a keypad 123, a touch screen 124 and a display 125 all of which are connected to processor IC 102. First mobile device 100 accepts user input using microphone 120, keypad 123 and touch screen 124. First mobile device 100 provides audio output to a user via speaker 121 and visual output via display 125. Subscriber information module 122 is communicatively coupled to processor IC 102. Subscriber information module 122 can be a removable memory module that contains encrypted access data that allows first mobile device 100 to access a wireless network via eNodeB 180. First mobile device 100 also has a Bluetooth® transceiver 137 and a near field communication (NFC) transceiver 138. Bluetooth® transceiver 137 and NFC transceiver 138 are in communication with processor IC 102. Bluetooth® transceiver 137 and NFC transceiver 138 allow for mobile device 100 to communicate with similarly equipped devices in close proximity or over a short range.

First mobile device 100 further includes a transceiver 130 that is communicatively coupled to processor IC 102 and to antenna 132. Transceiver 130 allows for wide-area or local wireless communication between first mobile device 100 and eNodeB 180 via a wireless signal 184. First mobile device 100 can be communicatively coupled to and in communication with ATS 300 via a communication path involving transceiver 130, antenna 132, wireless signal 184 and eNodeB 180. First mobile device 100 is capable of wide-area or local wireless communication with other mobile wireless devices or with eNodeB 180 that are at a fixed location. ATS 300 can transmit data and software to first mobile device 100 and receive data transmitted from first mobile device 100 and other mobile devices connected to the wireless network.

Figure 2:
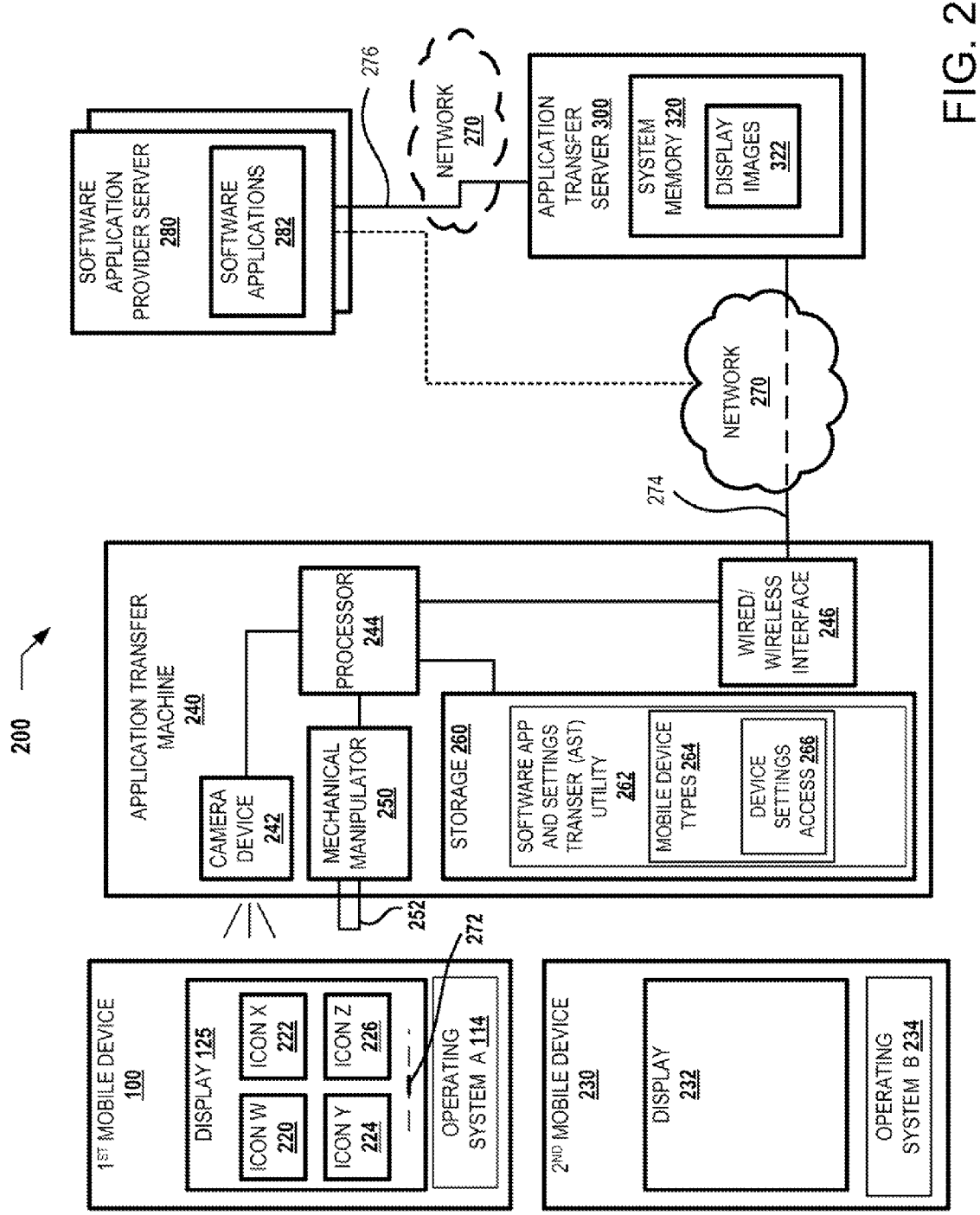
FIG. 2 provides a block diagram representation of an example application transfer machine for use with different mobile devices according to one embodiment.

FIG. 2 illustrates a software application transfer environment 200 for transferring software applications between mobile devices having different operating systems. In the discussion of FIG. 2, reference is also made to elements described in FIG. 1. Application transfer environment 200 comprises a first mobile device 100, a second mobile device 230, an application transfer machine (ATM) 240, a software application provider server (SAPS) 280 and ATS 300. ATM 240 is communicatively coupled to ATS 300 and optionally to SAPS 280 via a communication path involving wired/wireless connection 274 and network 270. Also, ATS 300 is communicatively coupled to SAPS 280 via a communication path involving wired/wireless connection 276 and network 270.

Specific details of the functional aspects of ATS 300 are described with reference to FIG. 3. ATS 300 includes a system memory 320 that can store display images 322 received from ATM machine 240 during the execution of AST utility 262. ATS 300 is communicatively coupled to one or more SAPS 280 via a communication path involving wired/wireless connection 276 and network 270. ATS 300 can cause software applications 282 to be wirelessly transmitted to second mobile device 230 via eNodeB 180, in one embodiment. Software application provider server 280 stores downloadable application code for software applications 282, and particularly software applications 282 that are designed to function and operate on devices that utilize operating system B 234, such as second mobile device 230. Software applications 282 that operate on operating system B 234 correspond to software applications 141 that operate on operating system A 114, but the applications cannot be interchangeably executed on the other operating system.

ATM 240 facilitates software application transfer from first mobile device 100 having operating system A 114 to second mobile device 230 having operating system B 234. First mobile device 100 comprises a display 125 and an operating system A 114. Various icons can be shown on display 125 including icon W 220, icon X 222, icon Y 224 and icon Z 226. Second mobile device 230 comprises a display 232 and an operating system B 234.

ATM 240 includes a processor 244 that is communicatively coupled to camera device 242, wired/wireless interface 246, mechanical manipulator 250 and storage 260. Processor 244 can be any suitable micro-processor or central processing unit. Camera device 242 captures various images, digitizes the images, and transmits the digital image data to processor 244. Wired/wireless interface 246 provides a communication interface between processor 244 and network 270. Mechanical manipulator 250 is a mechanical apparatus that includes one or more mechanical fingers 252 to contact and manipulate keypad 123 and touch screen 124 on first mobile device 100 (FIG. 1). Storage 260 provides nonvolatile storage for ATM 240. Storage 260 can be a hard disk or other types of storage media which are readable by a computer, such solid state memory or flash memory.

Stored within storage 260 are software applications and settings transfer (AST) utility 262. AST utility 262 includes a database of mobile device types 264 with a set of associated device settings access instructions 266 for accessing the specific device settings menu. For example, mobile device types 264 can provide a make and model of a mobile device, and the device settings access 266 can include instructions on how to access a settings menu for that specific make and model mobile device. In one implementation, execution of AST utility 262 on processor 244 triggers mechanical manipulator 250 to access first mobile device 100 and perform a series of mechanically-implemented inputs based on the device settings access instructions 266 associated with first mobile device 100. This implementation assumes that the stored mobile device types 264 associated with first mobile device 100 are known by AST machine 240. The specific stored mobile device types of first mobile device 100 can be either entered by a user of ATM machine 240 or retrieved electronically from first mobile device 100, in alternate embodiments. During operations of ATM machine 240, first mobile device 100 is positioned with its display screen 125 facing the lens of the camera device 242 and at a distance at which mechanical fingers 252 can touch the surface of display screen 125 and/or access other input mechanisms of first mobile device 100. Then, processor execution of AST utility 262 can further trigger camera device 242 to capture various images of application icons and settings presented on the display screen 125. AST utility 262 then configures the processor to transmit those captured images to ATS 300 via network 270.

Figure 3:
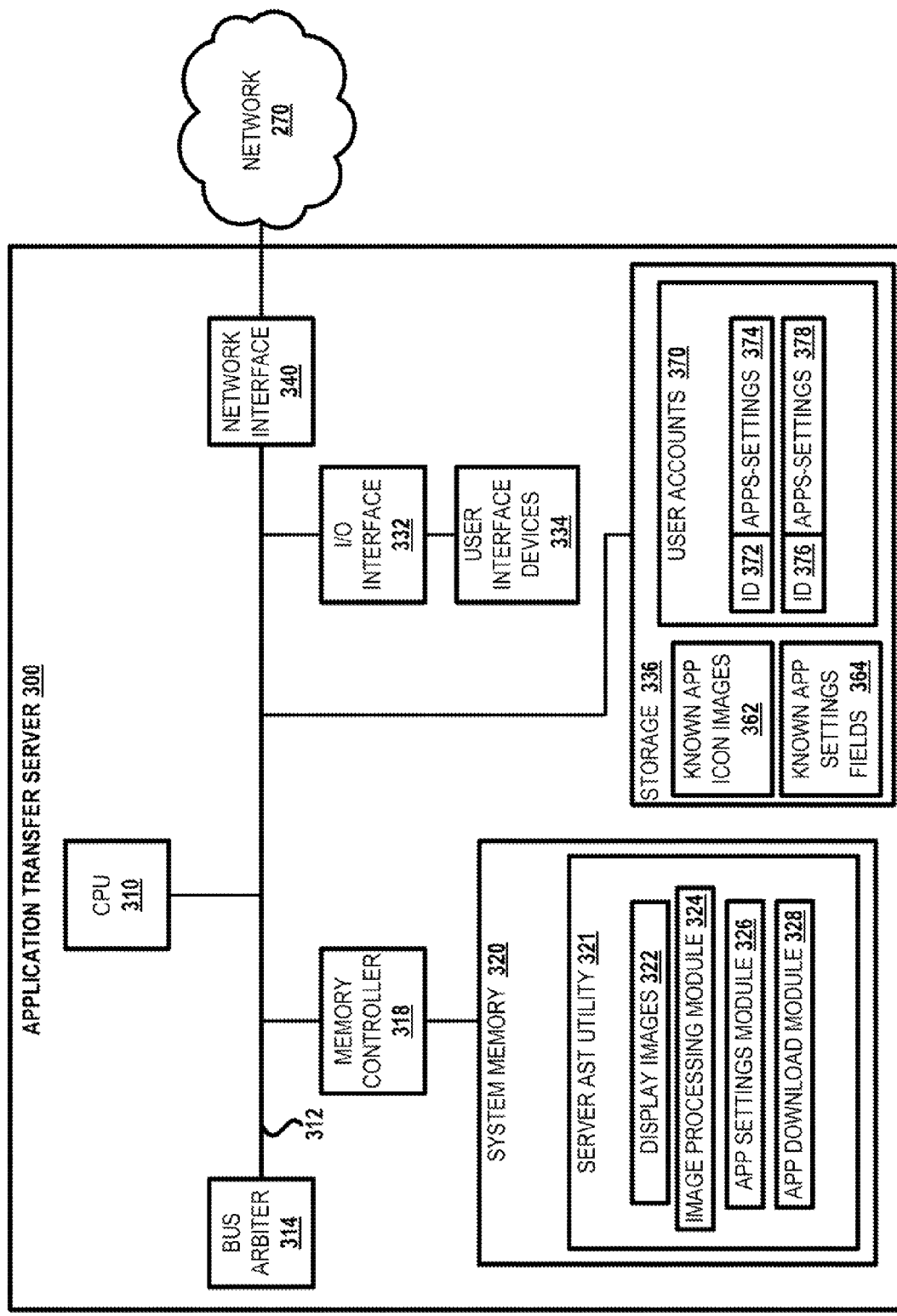
FIG. 3 illustrates a block diagram representation of an example application transfer server, according to one embodiment.

Referring to FIG. 3, there is illustrated a block diagram representation of an example application transfer server (ATS), as utilized within one embodiment. The application transfer server is described as having features common to a server or personal computer, including hand held and/or portable computers. However, as used herein, the term "server", is intended to include any type of computing device or machine that is capable of receiving and storing data and running a software program.

FIG. 3 and the following discussion are intended to provide a brief, general description of an exemplary server adapted to implement the described embodiments. While embodiments will be described in the general context of instructions residing on hardware within a server computer, those skilled in the art will recognize that embodiments may be implemented via a combination of program modules. Generally, program modules include routines, programs, components, and data structures, which perform particular tasks. The disclosure may also be practiced in distributed computing environments where tasks are performed by remote processing devices that are linked through a communications network. In a distributed computing environment, program modules may be located in both local and remote memory storage devices.

In the discussion of FIG. 3, reference is also made to elements described in FIG. 1 and FIG. 2. ATS 300 can include a processor or central processing unit (CPU) 310 coupled to memory controller 318 and associated system memory 320 via a system interconnect fabric 312. System interconnect fabric 312 further couples CPU 310 and system memory 320 to other components of ATS 300. In one embodiment, system interconnect fabric 312 can be an address and data bus. Commands on system interconnect fabric 312 are communicated to various system components under the control of bus arbiter 314. System memory 320 is a computer readable storage device that stores data as well as software programs and code that can be executed on CPU 310.

In one or more embodiments, system memory 320 can contain server-implemented applications and settings transfer (AST) utility 321, which executes on CPU 310 to perform one or more of the various functional processes described herein associated with ATS 300. In the illustrated embodiment, server AST utility 321 contains an image processing module 324, application (app) settings module 326, and application (app) download module 328. Image processing module 324 identifies the name and/or other identifying information of software applications 141 contained on first mobile device 100 (FIG. 1), whose application icons are received as display images 322. App settings module 326 determines application settings 142 (FIG. 1) for a respective software application contained on first mobile device 100 that corresponds to the received display images 322. Application (app) download module 328 initiates a download of an appropriate OS version of the corresponding identified software applications 282 to second mobile device 230 (FIG. 2). In one embodiment, server AST utility 321 configures CPU 310 to identify at least one software application 141 from received display images 322 and initiates a download of the appropriate OS-version of the identified software applications 282 to second mobile device 230 for installation of the appropriate OS version of the identified software application 282 on the second mobile device 230 (FIG. 2).

ATS 300 further includes computer readable storage devices or storage 336, such as a hard disk drive. Storage 336 can be communicatively coupled to system interconnect fabric 312. Storage 336 provides nonvolatile storage for ATS 300. Although the description of a computer readable storage device (and specifically storage devices 336) refers to a hard disk, it should be appreciated by those skilled in the art that other types of media which are readable by a computer, such as removable magnetic disks, CD-ROM disks, magnetic cassettes, flash memory cards, digital video disks, Bernoulli cartridges, and other later-developed hardware, may also be used in the exemplary computer operating environment.

Storage 336 can store known application icon images 362, known application settings fields 364, and user accounts 370. Known application icon images 362 are a database of known icon images that are compared to received display images 322. Known application settings fields 364 are a database of known application settings that are compared to received display images 322 of the settings shown on mobile device 100. In one implementation, user accounts 370 contain a database pairing user identifier (ID) with applications settings, such as first user ID 372/apps-settings 374 pair and second user ID 376/apps-settings 378 pair. User ID 372/376 identifies a respective mobile device and apps-settings 374/378 identify the software applications and settings associated with each corresponding mobile device.

ATS 300 also includes a plurality of user interface devices 334, which can be communicatively coupled to system interconnect fabric 312 by an input-output (I/O) interface 332. User interface devices 334 allow a user to provide input to and receive output from ATS 300. For example, user interface devices 334 can include one or more displays, keyboards, and pointing devices, such as a mouse.

ATS 100 further includes a network interface 340 by which ATS 300 can connect to network 270. In an embodiment, network 270 may be a local area network (LAN). In alternative embodiments, network 270 may include a wide area network (WAN), such as the Internet, or a personal area network. Network 270 enables access to resources and other components external to and/or outside of ATS 300. In one embodiment, one such resource/component is SAPS 280 (FIG. 2). Network 270 can be a virtualized cloud storage pool that uses storage media such as redundant arrays of hard disk drives. ATS 300 may operate in a networked environment, in which program modules employed by ATS 300, or portions of program modules employed by ATS 300, may be stored remotely and downloaded to system memory 320 or storage 336 as needed during processing of the particular program/application.

Figure 4:
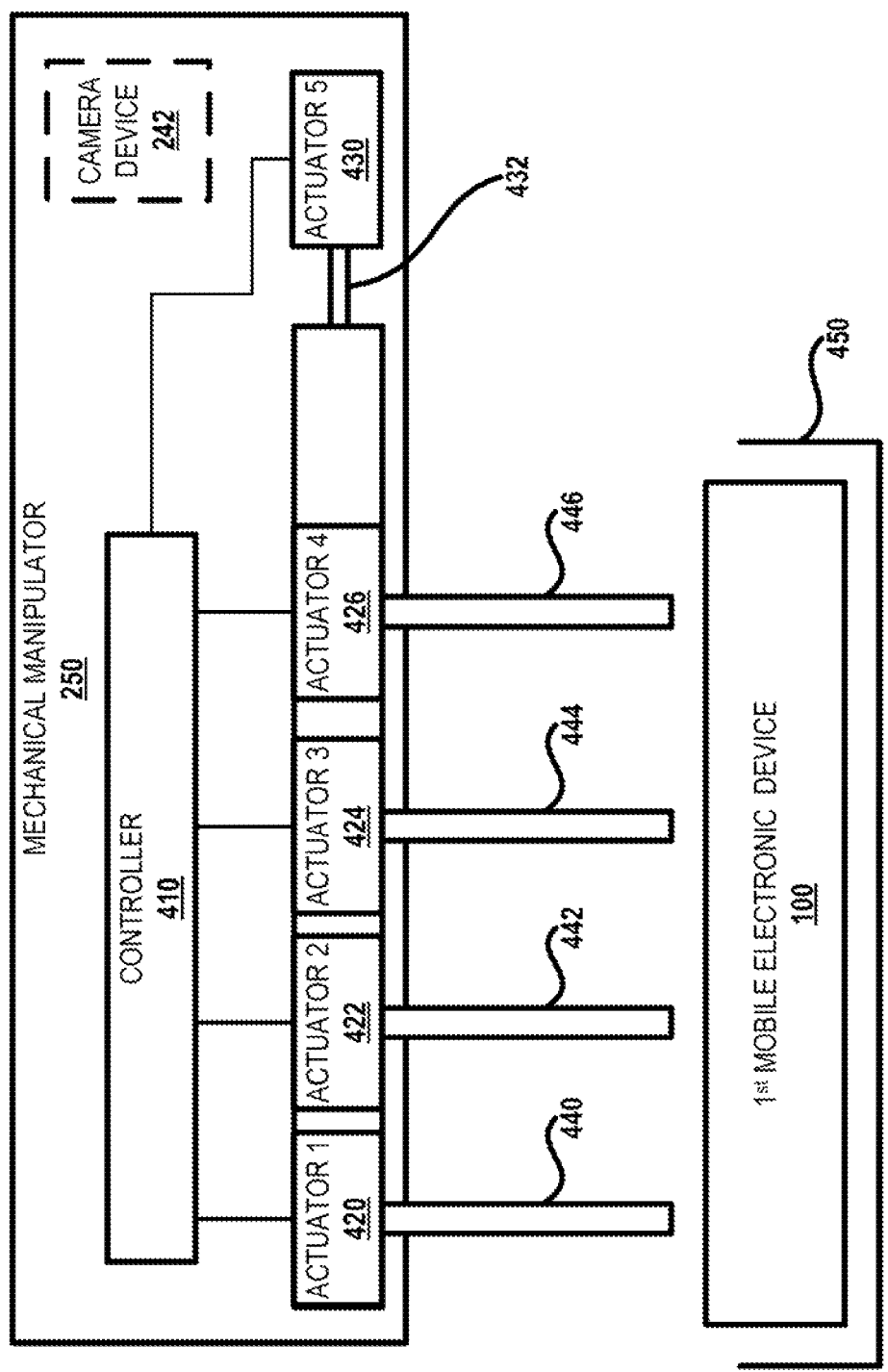
FIG. 4 illustrates a block diagram representation of an example mechanical manipulator according to one embodiment.

FIG. 4 illustrates further details of mechanical manipulator 250. Mechanical manipulator 250 is part of and mounted to ATM 240 (FIG. 2). Mechanical manipulator 250 comprises a controller 410 that is communicatively coupled to several linear actuators including linear actuator 1 420, linear actuator 2 422, linear actuator 3 424, linear actuator 4 426 and linear actuator 5 430. Linear actuator 5 430 is connected to the other linear actuators 420-426 through a shaft 432. Linear actuator 5 430 can extend and retract shaft 432 moving linear actuators 420-426 back and forth in a horizontal direction generally parallel to first mobile device 100. Attached to each of linear actuators 420-426 is a mechanical finger. Linear actuator 1 420 has a first mechanical finger 440. Linear actuator 2 422 has a second mechanical finger 442. Linear actuator 3 424 has a third mechanical finger 444 and linear actuator 4 426 has a fourth mechanical finger 446. Linear actuators 420-426 can individually extend and retract respective mechanical fingers 440-446 up and down in a vertical direction generally perpendicular to first mobile device 100. Camera or image capture device 242 is positioned within or adjacent to mechanical manipulator 250. Specifically, camera or image capture device 242 is positioned within view of display 125 (FIG. 2) of first mobile device 100 such that camera device 242 can take digital images of display 125.

In one embodiment, a cradle 450 is mounted to ATM machine 240 (FIG. 2) in proximity to mechanical manipulator 250 and below mechanical fingers 440-446. Cradle 450 is designed with specific dimensions to be able to receive and hold a mobile device, such as first mobile device 100. First mobile device 100 is placed in cradle 450 such that display 125 faces towards, is adjacent to, and is in vertical alignment with mechanical fingers 440-446. Controller 410 of mechanical manipulator 250 is further communicatively coupled to processor 244 (FIG. 2). Processor 244 can trigger controller 410 to move linear actuators 420-426 and their attached mechanical fingers 440-446 and linear actuators 430 and shaft 432 in a desired manner. In one embodiment, processor 244 triggers controller 410 to move mechanical fingers 440-446 into contact with and to manipulate display 125 or a keypad 123 (FIG. 1) of first mobile device 100 so as to scroll or show one or more desired screens on display 125 in order to capture one or more images presented on the screens using camera device 242.

Figure 5:
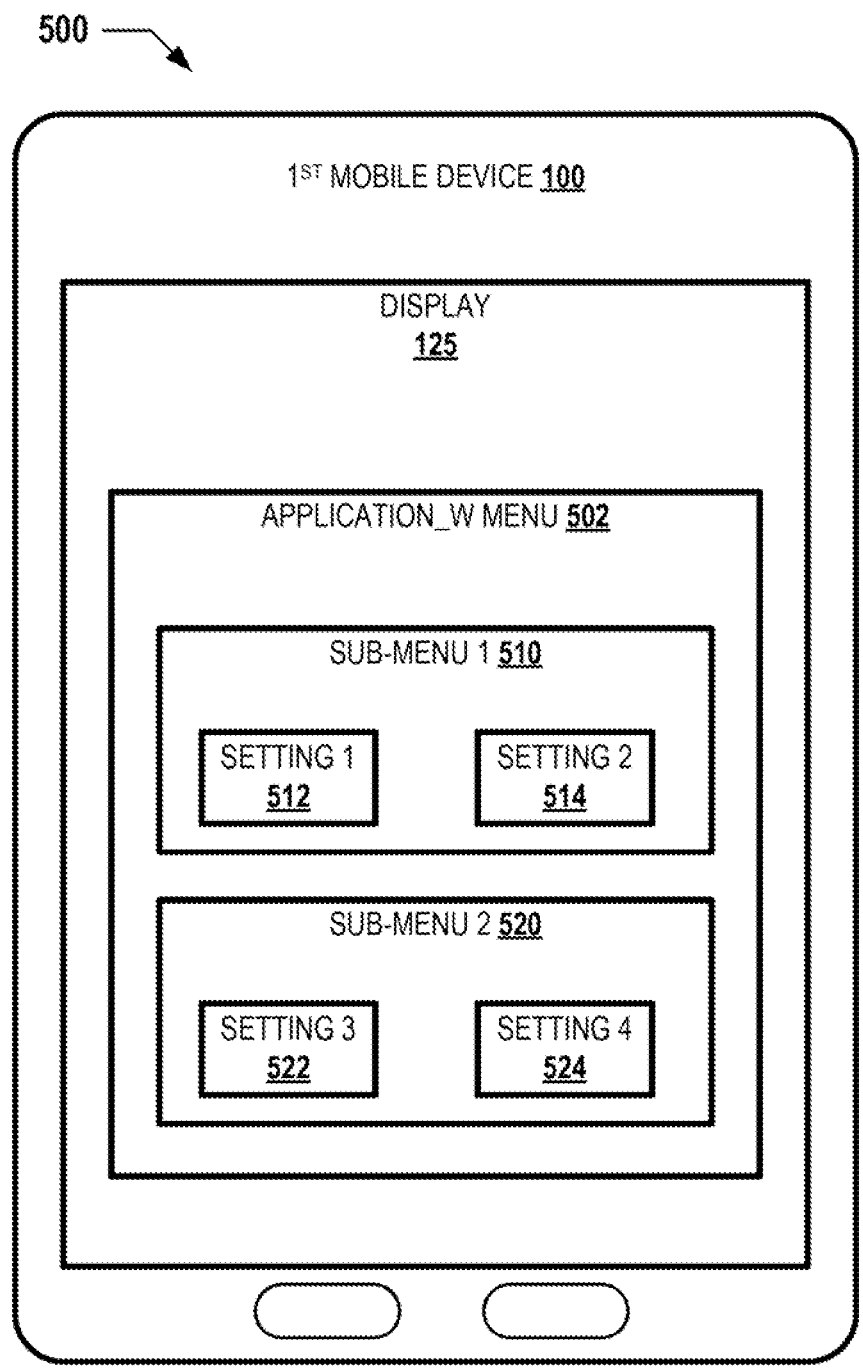
FIG. 5 illustrates the contents of an example application menu on a mobile device according to one embodiment.
Figure 6:
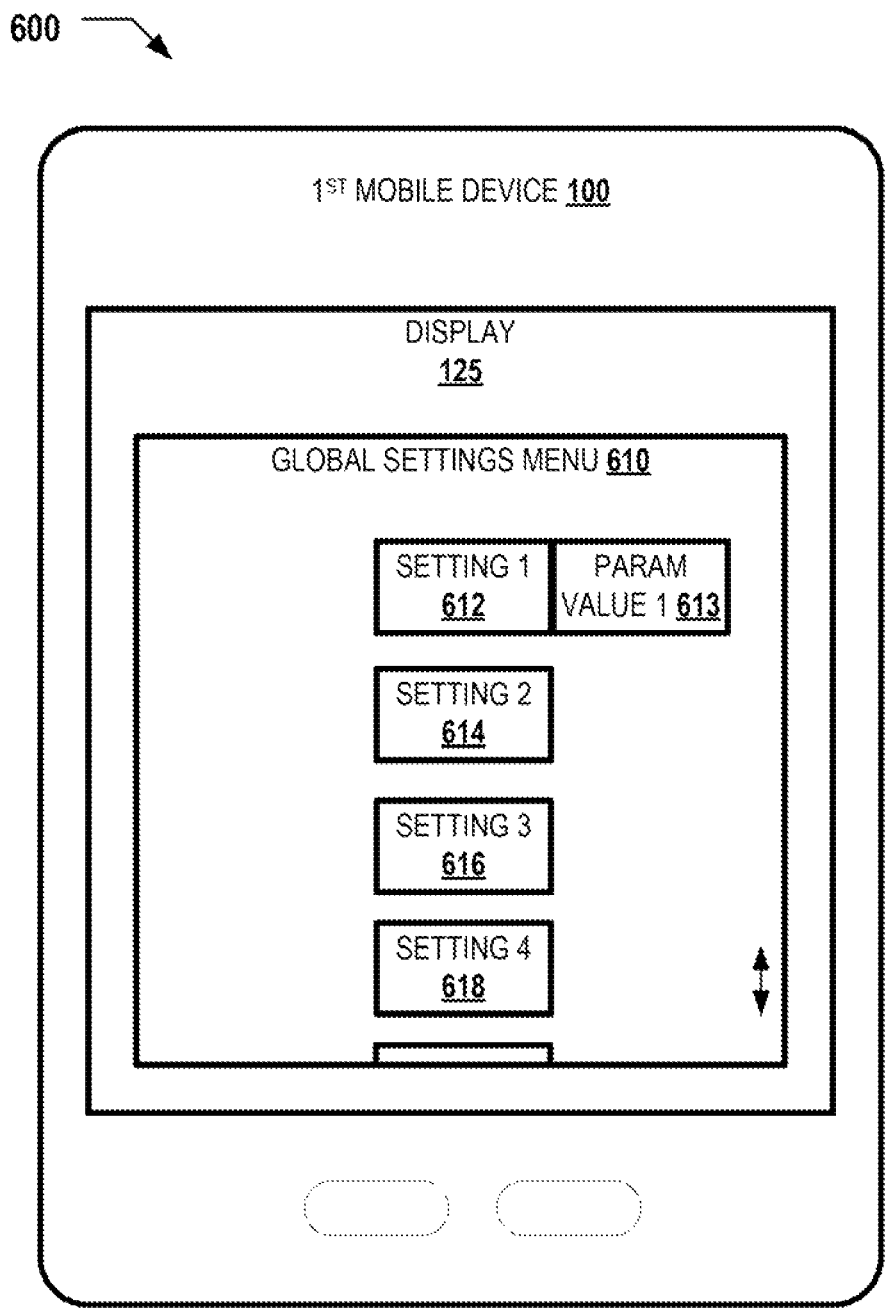
FIG. 6 illustrates the contents of an example global settings menu on a mobile device according to one embodiment.

FIGS. 5-6 present different views of different types of content that can be captured from display 125 of first mobile device 100 using ATM machine 240. In the discussion of each of FIGS. 5-6, reference is also made to elements described in FIGS. 1-4. Referring now specifically to FIG. 5, there is illustrated an example view 500 of contents of an application menu presented on display 125 of first mobile device 100. Application_W menu 502 is triggered to be displayed by the actions of mechanical manipulator 250 touching and scrolling display 125/keypad 123. In FIG. 5, mechanical manipulator 250 has selected application icon W 220 (FIG. 2) associated with the launch and execution of software app_W 141 (FIG. 1) and drilled down to application W menu 502. Display 125 shows a screen shot containing application W menu 502. Application W menu 502 contains settings and values associated with the software app W 141 running on operating system A 114 of mobile device 100. In one embodiment, application W menu 502 can include sub-menu 1 510 and sub-menu 2 520. Sub-menu 1 510 contains setting 1 512 and setting 2 514. Sub-menu 2 520 contains setting 3 522 and setting 4 524.

FIG. 6 illustrates contents of an example view 600 of contents of a global settings menu presented on display 125 of first mobile device 100. In one embodiment, global settings menu 610 can be triggered for display by the actions of mechanical manipulator 250 touching and scrolling display 125 and/or keypad 123. In FIG. 6, mechanical manipulator 250 has navigated through screens of display 125 and drilled down to global settings menu 610. In one embodiment, global settings menu 610 is stored with general settings 144 in storage 140. Display 125 shows a screen shot containing global settings menu 610. Global settings menu 610 contains settings and values associated with the software applications running on operating system A 114 of first mobile device 100. In one embodiment, global settings menu 610 has several setting fields including setting 1 612, setting 2 614, setting 3 616 and setting 4 618. One or more of the setting fields can include an associated parameter value. For example, setting 1 612 is shown with an associated parameter value 1 613.

Figure 7:
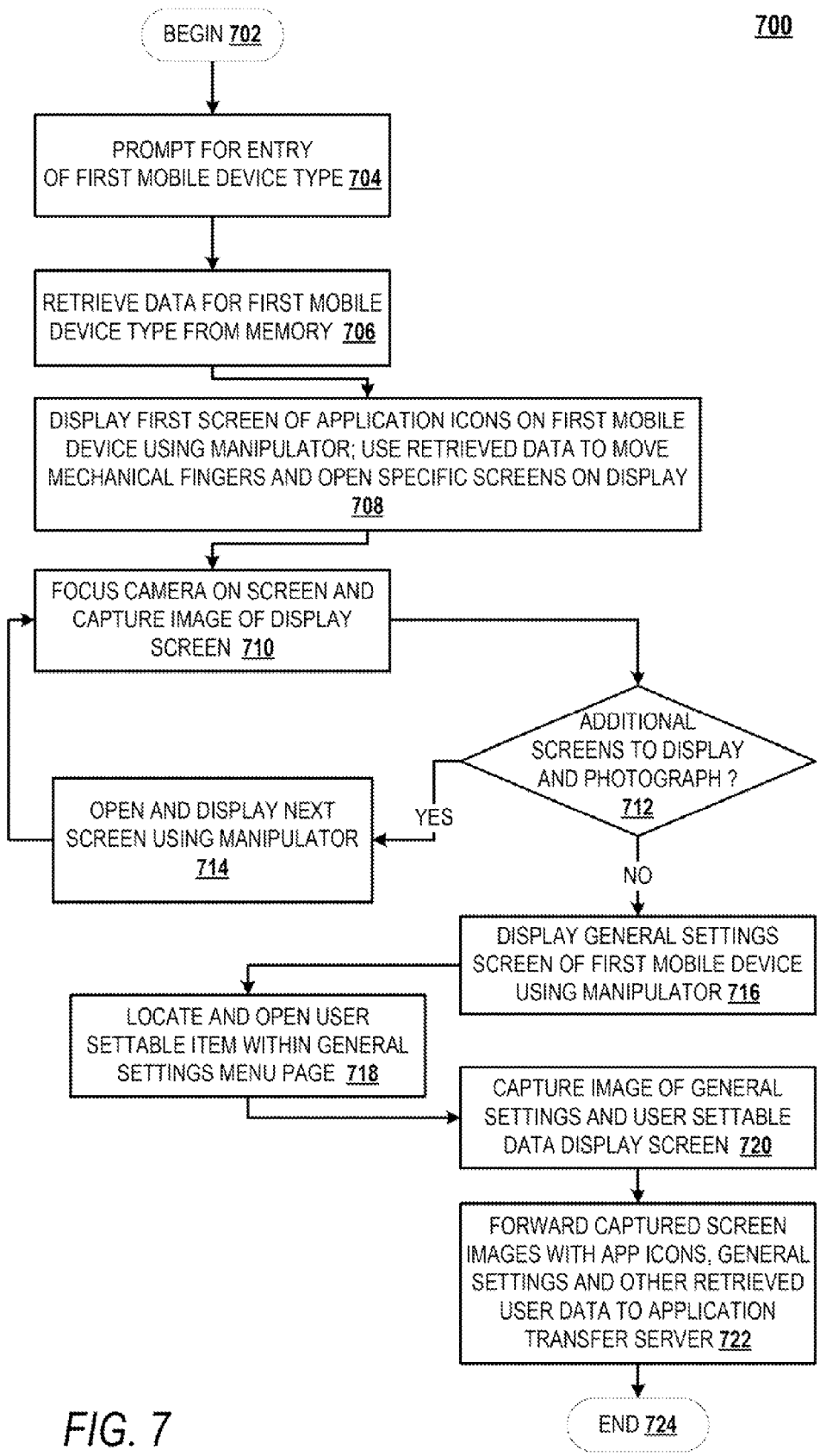
FIG. 7 provides a flowchart illustrating the method processes for retrieving and scanning data and general settings from a first mobile device according to one embodiment.

FIGS. 7-10 present various flow charts of example methods by which one or more of the various processes described herein can be implemented. In the discussion of each of the flow charts, reference is made to elements described in the previously described system figures. FIG. 7 illustrates a flowchart of an exemplary method process for capturing display images 322 and general settings 144 from first mobile device 100 that includes a general settings menu and transmitting the captured images and general settings to ATS 300 using ATM 240 according to an illustrative embodiment. Computer implemented method 700 can be implemented in ATM 240 via processor 244 execution of code from software AST utility 262. As shown in FIG. 2, software instructions and code to execute computer implemented method 700 can be stored on storage 260 for execution by processor 244.

The method of FIG. 7 begins at block 702. With a mobile device placed within cradle 450, ATM 240 prompts a user for entry of one or more identifying information of the first mobile device type (block 704). In one embodiment, a user can input the type for a first mobile device 100 and the type for a second mobile device 230 on which the OS appropriate versions of the applications present on the first mobile device are being installed. Additionally, in one or more embodiments, a user can input a mobile device identifier (ID) for one or both of the first mobile device 100 and the second mobile device 230.

Processor 244 accesses its database of mobile device types 264 and device settings access information 266 and retrieves type and settings access data for the identified first mobile device (block 706). Processor 244 causes mechanical manipulator 250 to access and display a first screen containing software application icons 220-226 of the first mobile device 100 (block 708). Processor 244 uses mobile device types 264 and device settings access 266 to determine how to move mechanical fingers 440-446 (block 708). At block 710, processor 244 causes camera device 242 to focus on display 125 and capture an image of the display screen. In one embodiment, the captured images can be stored to storage 160. Processor 244 determines if there are any additional display screens to trigger to be displayed and photographed (decision block 712). In response to their being additional display screens to display and scan, processor 244 causes the next display screen to be opened and shown on display 125 using mechanical manipulator 250 (block 714), and processor 244 scans the display 125 again to capture an image of the next display screen (block 710). Processor 244 continues to display and scan images of the display screen until all of the display screen images have been captured.

In response to there being no additional display screens to display and scan, processor 244 causes mechanical manipulator 250 to access a general settings screen of the first mobile device by selecting a menu option and/or a general settings icon (block 716). Mechanical manipulator 250 thus opens a corresponding general settings page or menu 610 on display 125 that contains setting-parameter value pairs (i.e. setting 1 612, parameter value 613) at block 716. Also, at block 718, processor 244 locates at least one user settable item (i.e. settings 612-618) and opens the at least one user settable item. At block 720, processor 244 causes camera device 242 to photograph display 125 and capture an image of the general settings 144 and one or more settings values within the at least one user settable item. Processor 244 forwards the captured screen images 322 of application icons, general settings, setting values, and other retrieved user data to ATS 300 along with identifying information for the images (block 722). Method 700 ends at block 724.

Figure 8:
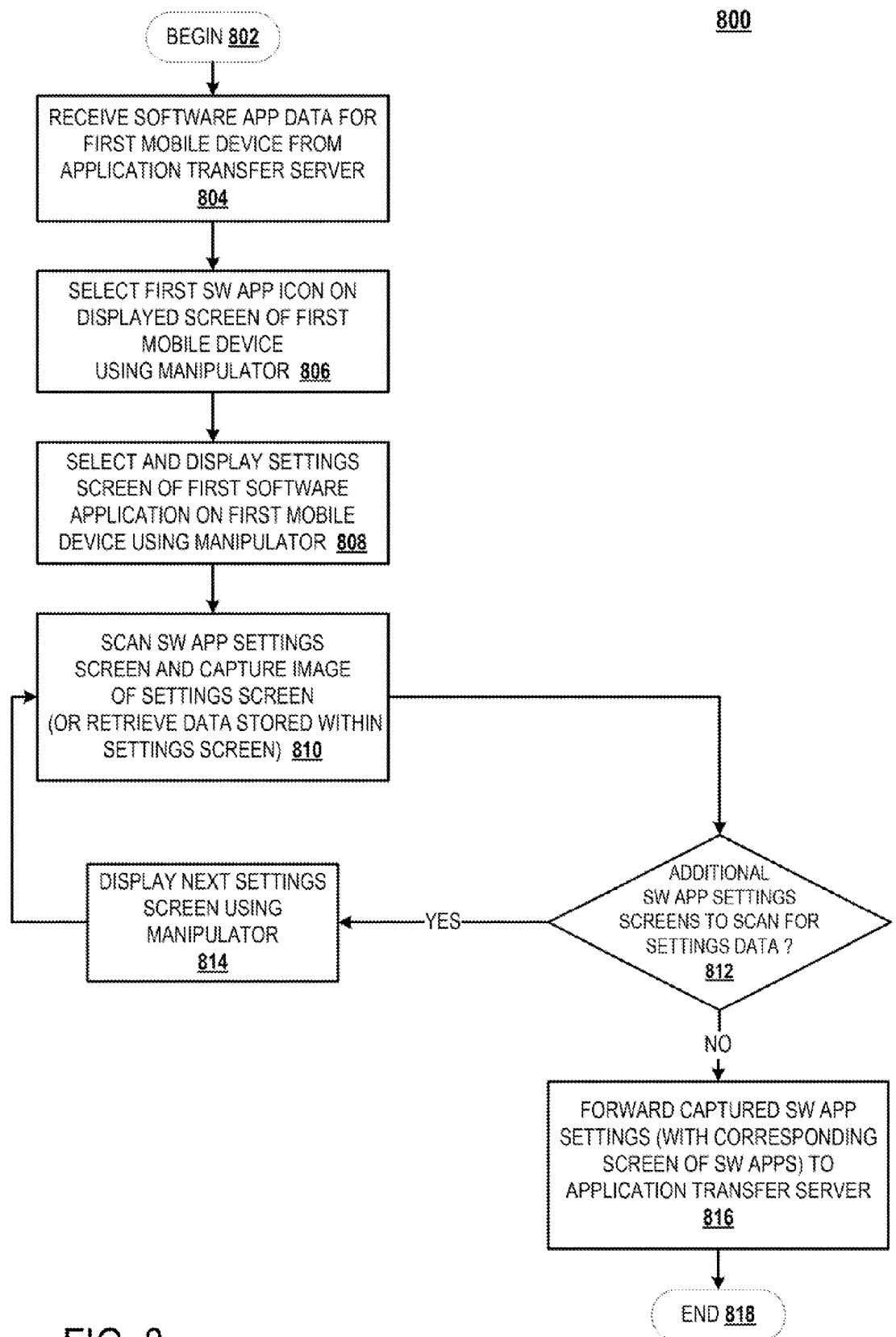
FIG. 8 provides a flowchart illustrating the method processes for retrieving and scanning applications information and configuration settings from a first mobile device according to one embodiment.

FIG. 8 illustrates a flowchart of an exemplary method process for accessing specific application settings data and general settings information 144 from first mobile device 100 based on information communicated to ATM 240 by ATS 300. In one embodiment, the information that is communicated includes instructions on what specific series of manipulations is required to be performed by mechanical manipulator 250 to access the specific set of data related to the identified application. In one or more embodiments, the information is communicated in response to a first identification by ATS 300 of one or both of (a) a device type and/or model and (b) a configuration of an application whose icon was captured by camera device 242 on first mobile device 100. ATS 300 accesses a database of configuration data that includes the specific configuration data for the identified application, and returns the configuration data for that identified application to the ATM 240. In another embodiment, the information is communicated in response to identification by ATS 300 of a user account that includes a listing of the downloaded applications hosted on first mobile device 100, as well as the access methods for opening the settings fields of the particular downloaded application. This latter embodiment is illustrated by method 800 of FIG. 8. Computer implemented method 800 can be implemented in application transfer machine 240 via processor 244 code execution from software AST utility 262. As shown in FIG. 2, software instructions and code to execute computer implemented method 800 can be stored on storage 260 for execution by processor 244.

The method of FIG. 8 begins at block 802. ATM 240 receives from ATS 300 application configuration data (e.g., known application icon images 362 and access methods for opening the corresponding application settings fields 364) for an identified user account (block 804). In one example, the application data provides a process for accessing a settings page of software application_W menu 502 whose selection icon W 220 is visible on the display screen. With the first mobile device 100 placed or positioned within cradle 450, processor 244 triggers mechanical manipulator 250 to select a first software application icon (i.e. icon W 220) on display 125 and open the first software application on first mobile device 100 (block 806). At block 808, processor 244 uses the downloaded software application configuration data to trigger mechanical manipulator 250 to select and display a settings screen associated with the first software application icon (i.e. sub-menu 1 510 and sub-menu 2 520) on display 125. Processor 244 causes camera device 242 to capture an image of the settings page (i.e. setting 1 512, setting 2 514, setting 3 522 and setting 4 524) or retrieve data stored within the settings screen at block 810.

According to one embodiment, processor 244 determines if there are any additional software application screens to display and scan for additional settings (decision block 812). In response to their being additional application settings screens to display and scan, processor 244 causes the next settings screen to be shown on display 125 using mechanical manipulator 250 (block 814), and causes camera device 242 to capture an image of the next settings screen (block 810). Processor 244 continues to display and scan images of the settings screens until all of the settings images have been captured. In response to their being no additional settings to display and scan, processor 244 forwards the captured display images 322 of the settings pages to ATS 300 along with identifying information for the captured display images 322 (block 816). Method 800 ends at block 818.

Figure 9:
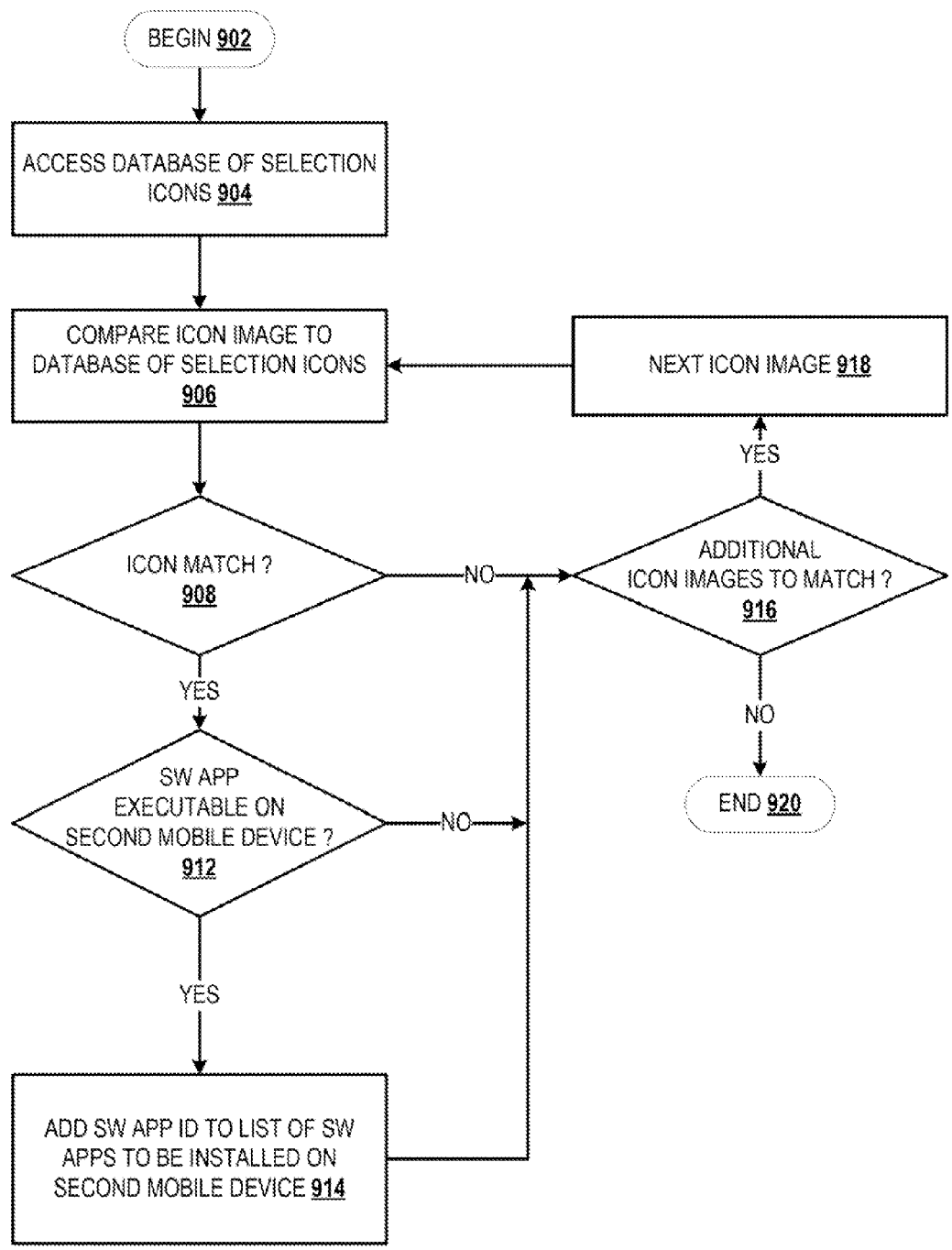
FIG. 9 provides a flowchart illustrating the method processes for matching scanned icon images to a database of selection icons according to one embodiment.

FIG. 9 illustrates a flowchart of an exemplary method process, performed by ATS 300, for matching icon images with a database of selection icons and generating a list of software applications to be installed on second mobile device 230 according to an illustrative embodiment. Computer implemented method 900 can be implemented in ATS 300 via CPU 310 execution of code from server AST utility 321 and/or image processing module 324. As shown in FIG. 3, software instructions and code to execute computer implemented method 900 can be stored on system memory 320 for execution by CPU 310.

The method of FIG. 9 begins at block 902. CPU 310 executes image processing module 324 to access a database of known application selection icons or images 362 (block 904). CPU 310 compares each application selection icon represented within a first icon image of display images 322 with the database of known selection icons 362 (block 906). At decision block 908, CPU 310 determines if the application selection icon from the first icon image matches one of the known application selection icons 362. In response to the application selection icon from the first icon image matching one of the known application selection icons 362, CPU 310 determines if the matching software OS version application is executable on second mobile device 230 (decision block 912). In one embodiment, determining if the matching software application is executable on second mobile device 230 includes identifying which software applications within the list of applications ID can be installed to operate on operating system B 234. This check is implemented to ensure that only software applications that operate on operating system B 234 are downloaded to second mobile device 230.

In response to the matching software application being executable on the second mobile device 230, CPU 310 executes image processing module 324 to add or place the application identifier (ID) for the matching software application within a list of application IDs 372/376 of applications that are present on the first mobile device (block 914). The list of application IDs 372/376 indicates applications to be downloaded and installed on second mobile device 230. In response to the application selection icon from the first icon image not matching one of the known application selection icons 362 or the matching software application not being executable on the second mobile device, CPU 310 determines if there are any additional selection icon images represented within display images 322 to be matched with the database of known selection icons 362 (decision block 916).

In response to the existence of additional selection icon images to be matched with the database of known selection icons 362, CPU 310 selects another icon image to be matched (block 918) and returns to block 906 to continue comparing the next application selection icon image with the database of known selection icons 362. In response to no more additional selection icon images remaining to be matched with the database of known selection icons 362, method 900 ends at block 920.

Figure 10:
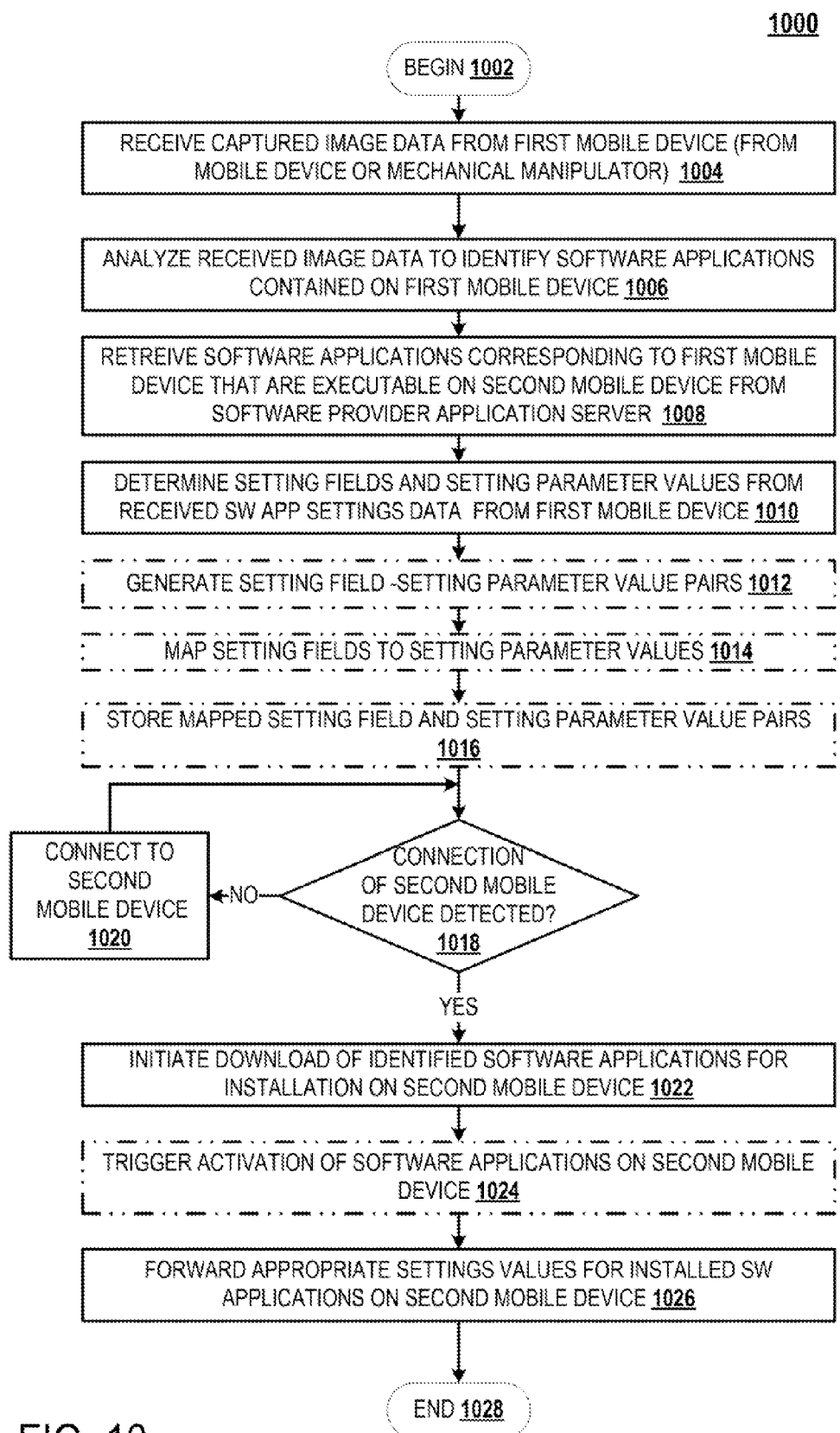
FIG. 10 provides a flowchart illustrating the method processes for analyzing images and retrieving software applications for a first mobile device that are executable on a second mobile device according to one embodiment.

With reference to FIG. 10, a flowchart of an exemplary method process for analyzing captured display images 322, retrieving software applications, and downloading the software applications to a second mobile device 230 using ATS 300 is shown according to an illustrative embodiment. Computer implemented method 1000 can be implemented in ATS 300 via CPU 310 execution of code from server AST utility 321 including image processing module 324, application settings module 326 and application download module 328. As shown in FIG. 3, software instructions and code to execute computer implemented method 1000 can be stored on system memory 320 for execution by CPU 310.

The method of FIG. 10 begins at block 1002. CPU 310 receives from ATM 240 captured image data of display screens from first mobile device 100 and stores the display images 322 to system memory 320 (block 1004). The received display images contain at least one application (app) selection icon visible within the display images. Image processing module 324 executing on CPU 310 analyzes the received display images 322 to identify the software applications (i.e. APP_W 141) contained on first mobile device 100 (block 1006).

At block 1008, CPU 310 executes application download module 328 to retrieve from SAPS 280, software applications 282 corresponding to applications on the first mobile device 100 that are executable on operating system B 234 and second mobile device 230. CPU 310 executes application settings module 326 to determine setting fields and setting parameter values for second mobile device 230 from the received software application settings data (i.e. APP_W 141 and parameter value 143) of first mobile device 100 (block 1010). According to one embodiment, the identification of setting parameter values from the settings screen image includes accessing a stored settings page containing known application settings fields 364 corresponding to the identified software application from a database linking applications with respective settings fields; identifying a location of one or more fields within the stored settings page in which settings parameter values are provided; and performing a character-based recognition of alphanumeric and other character contents that are present in similarly-located fields of the first settings screen image to identify the settings parameter values of the software application.

In an optional embodiment, illustrated in blocks 1012 through 1016 and starting at block 1012, CPU 310 executing application settings module 326 generates "settings field and setting parameter value" pairs (i.e. setting 1 612-parameter value 1 613 pair) for second mobile device 230. CPU 310 maps the setting fields of second mobile device 230 to the setting parameter values of first mobile device 100 (block 1014) and stores the mapped setting field-setting parameter value pairs (i.e. setting 1 612-parameter value 1 613 pair) for second mobile device 230 (block 1016).

At decision block 1018, CPU 310 executes application download module 328 to determine if the second mobile device 230 is in communication with ATS 300 via eNodeB 180 and wireless signal 184. In response to no detection of a connection to second mobile device 230, CPU 310 establishes a connection to second mobile device 230 via eNodeB 180 (block 1020). In response to the detection of a connection with second mobile device 230, CPU 310 initiates a download of the identified software applications 282 to second mobile device 230 for installation on second mobile device 230 via eNodeB 180 (block 1022).

In another optional embodiment, illustrated in block 1024, CPU 310 executing application download module 328 triggers installation and activation of the software application on second mobile device 230. At block 1026, CPU 310 forwards the corresponding appropriate setting parameter values to second mobile device 230 triggering the second mobile device to populate corresponding setting fields of the software applications installed on the second mobile device with the setting parameter values. Method 1000 terminates at block 1028.

Figure 11:
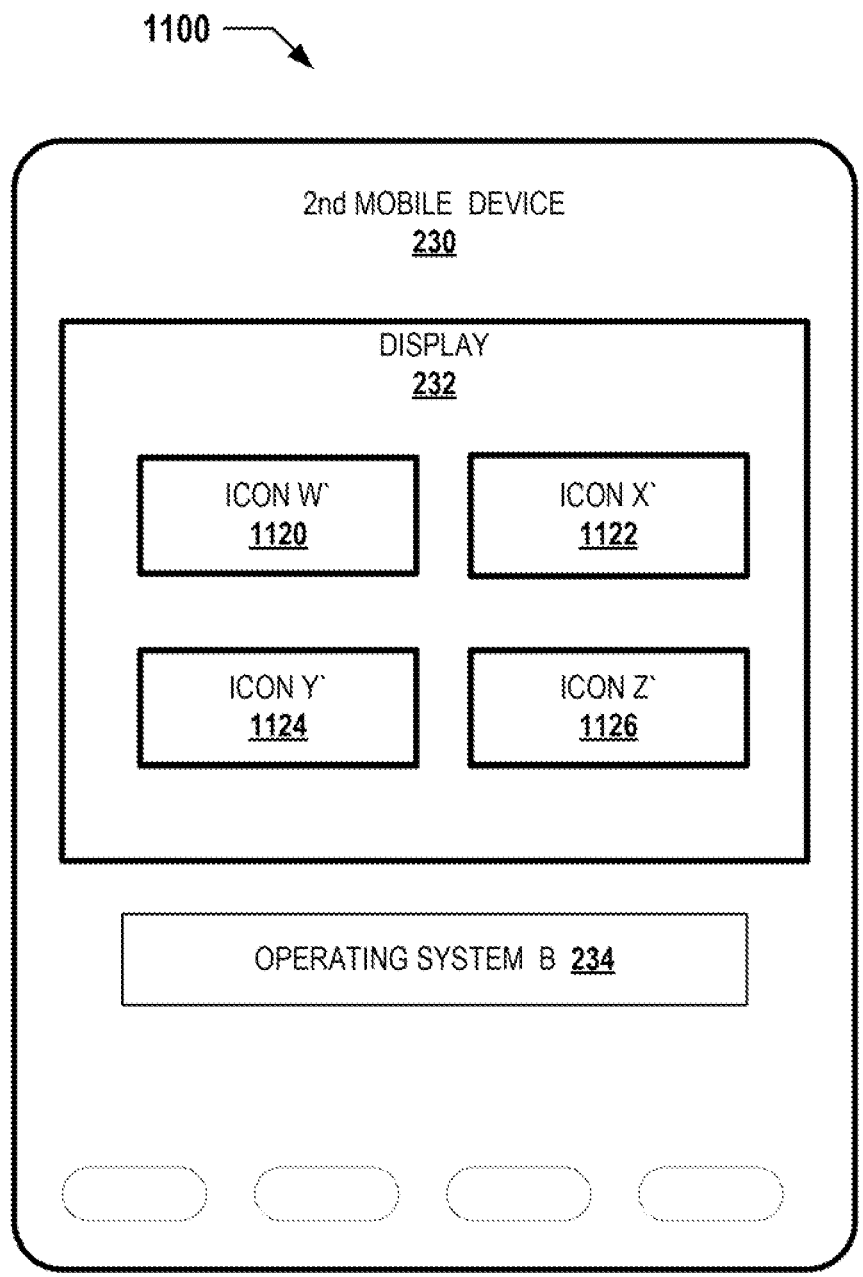
FIG. 11 illustrates the contents of an example display of a second mobile device on which applications are being loaded, identified from a first mobile device having a different operating system, according to one embodiment.

FIG. 11 illustrates an example view 1100 of contents of second mobile device 230 after one or more software applications 282 that can operate on operating system B 234 have been downloaded from SAPS 280 and installed onto second mobile device 230. Display 232 shows a screen shot containing icon W' 1120, icon X' 1122, icon Y' 1124 and icon Z' 1126. Each of icons 1120-1126 are associated with the launch of a software application that is configured to run on operating system B 234 and which corresponds to the original set of software applications (W, X, Y, and Z) from first mobile device 100 that are identified and then downloaded for use on second mobile device 230 using the various processes described herein.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present invention is defined only by the appended claims.

As will be appreciated by one skilled in the art, aspects of the present disclosure may be embodied as a system, or method. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present disclosure may be implemented using any combination of software, firmware or hardware. As a preparatory step to practicing the disclosure in software, the programming code (whether software or firmware) will typically be stored in one or more machine readable storage devices such as fixed (hard) drives, diskettes, optical disks, magnetic tape, semiconductor memories such as ROMs, PROMs, etc., thereby making an article of manufacture in accordance with the disclosure. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the disclosure may be practiced by combining one or more machine-readable storage devices containing the code according to the present disclosure with appropriate processing hardware to execute the code contained therein. An apparatus for practicing the disclosure could be one or more processing devices and storage systems containing or having network access to program(s) coded in accordance with the disclosure.

Thus, it is important that while an illustrative embodiment of the present disclosure is described in the context of a fully functional computer (server) system with installed (or executed) software, those skilled in the art will appreciate that the software aspects of an illustrative embodiment of the present disclosure are capable of being distributed as a program product in a variety of forms, and that an illustrative embodiment of the present disclosure applies equally regardless of the particular type of media used to actually carry out the distribution.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all functional elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method of transferring software applications between mobile devices having different operating platforms, the method comprising:
   receiving, by a computing device, an image of a display screen of a first mobile device with at least one application selection icon visible within the image;
   analyzing, by the computing device, the image to identify at least one software application from the at least one selection icon by at least:
      accessing, by the computing device, a database of known selection icons;
      comparing, by the computing device, each application selection icon represented within the image with the known selection icons; and
      in response to an application selection icon from the image matching one of the known selection icons, placing, by the computing device, an application identifier within a list of application identifiers for applications that are present on the first mobile device, which in the list of applications indicate applications that should be installed on a second mobile device; and
   initiating, by the computing device, a download of the at least one application to the second mobile device for installation of the at least one application on the second mobile device.

2. The method of claim 1, further comprising:
   receiving a settings screen image associated with a particular application that has selection icon present within the at least one selection icon visible in the image;
   identifying from the settings screen image at least one setting parameter value associated with the particular application at the first mobile device; and
   in response to (a) completion of a download of the particular application to the second mobile device and (b) identifying the settings screen image containing the at least one setting parameter value, forwarding the at least one setting parameter value to the second mobile device to trigger the second mobile device to populate a corresponding settings field of the particular application installed at the second mobile device with the at least one setting parameter value.

3. The method of claim 2, wherein the database is a first database and identifying the at least one setting parameter value from the settings screen image comprises:
accessing a stored settings page corresponding to the particular application from a second database linking applications with respective settings pages;
identify a location of one or more fields within the stored settings page in which settings parameter values are provided; and
performing a character-based recognition of alphanumeric and other character contents that are present in fields of the settings screen image to identify the settings parameter values of the particular application.

4. The method of claim 1, further comprising:
receiving a general settings screen image associated with the first mobile device with at least one general settings field including a general settings value utilized at the first mobile device;
associating a corresponding settings field of the second mobile device with the at least one general settings field;
pairing the corresponding settings field with the general settings value; and
storing the settings field-general settings value pairing for utilization during setup of the corresponding settings field on the second mobile device.

5. The method of claim 1, wherein:
the first mobile device executes a first operating platform,
the second mobile device executes a second operating platform that is different than the first operating platform, and
the method further comprises:
identifying which applications within the list of applications identifier can be installed on the second operating platform of the second mobile device for operation thereon;
removing from the list any application IDs for applications that cannot be operated on or installed on the second operating platform of the second mobile device; and
wherein the initializing of a download of the at least one application comprises downloading only applications identified on the list of application identifiers.

6. The method of claim 1, wherein the image of the display screen is received from an applications transfer machine that is communicatively coupled to the computing device.

7. The method of claim 2, further comprising: in response to identification of the particular application, forwarding instructions to trigger an applications transfer machine to drill down into a menu option for the particular application to open a settings page associated with the particular application, wherein the applications transfer machine performs a corresponding series of processes to access and open the settings page, capture an image of the settings page, and return the captured image to the computing device.

8. The method of claim 1, further comprising:
receiving, with the first display image, an identifier of at least one the first mobile device, the second mobile device, and a user of one of the first mobile device and the second mobile device; and
storing an associated application name corresponding to each of the at least one application identified from the first display screen within an account associated with the received identifier;
wherein the initiating a download to the second mobile device is triggered by an access by the second mobile device to the account.

9. The method of claim 1, further comprising retrieving the at least one software application from an application server that is communicatively coupled to the computing device, wherein retrieving the at least one software application is initiated prior to initiating the download.

10. A machine for facilitating application transfer from devices having different operating platforms, the machine comprising:
a camera;
a communication interface that enables the machine to communicate with an external computing device;
at least one actuator;
at least one mechanical arm coupled to the actuator;
at least one input device;
a memory storage having stored thereon an application and settings transfer utility having code for enabling the machine to operate; and
a processor that is communicatively coupled to the camera, the at least one actuator, the at least one input device, and the memory storage and which executes the transfer utility to configure the machine to:
in response to activation of the machine following entry of one or more identifying information, including an identifier of a first mobile phone having a display screen placed within view access of the camera and within reach of the at least one mechanical arm:
access a first screen of the first mobile device;
capture an image of the first screen with the camera;
record the image within the memory storage; and
forward the image to the external computing device along with the identifying information.

11. The machine of claim 10, wherein the application and settings transfer utility further configures the machine to:
receive from the external computing device, instructions indicating a process for accessing a settings page of a particular application that has a selection icon visible on the first screen;
trigger the at least one actuator to operate the mechanical arm to:
select the selection icon of the particular application to open the particular application on the first mobile device;
access the settings page of the particular application via the indicated process for accessing the settings page;
capture a settings page image with the camera; and
forward the settings page image to the external computing device.

12. The method of claim 10, wherein the application and settings transfer utility further configures the machine to:
prompt a user for entry of the one or more identifying information, including (a) a mobile device type for the first mobile device and for a second mobile device on which the applications present on the first mobile device are being installed and (b) a mobile device identifier for at least one of the first mobile device and the second mobile device.

13. The machine of claim 10, wherein the code of the application and settings transfer utility that configures the machine to access the settings page comprises code that configures the machine to: perform a series of processes required to drill down into a menu option for an identified application to open a settings page associated with the identified application; and capture an image of the settings page.

14. The machine of claim 10, wherein the application and settings transfer utility further configures the machine to:
- access a general settings affordance on the first mobile device from among a menu item and a general settings icon;
- open a corresponding general settings page on the first mobile device;
- locate at least one user settable item within the general settings page;
- open the at least one user settable item;
- capture an image of one or more settings values within the at least one user settable item; and
- forward the captured image of the one or more settings values along with an image identification of a corresponding user settable item to the external computing device.

15. The machine of claim 10, wherein the application and settings transfer utility further configures the machine to:
- manipulate the first mobile phone to provide a second screen;
- capture a next image of the second screen with the camera;
- record the next image within the memory storage; and
- forward the next image to the external computing device.

16. The machine of claim 11, wherein the application and settings transfer utility further comprises codes that configures the machine to:
- process the application selection image to identify the at least one application within the first display screen image;
- capture one or more settings parameter values of the particular application that has a settings page access process pre-programmed into the machine; and
- forward to the external computing device (1) a pairing of the identifier of the first particular application along with the one or more settings parameter values captured and (2) at least one of the identifier of the first mobile device, an identifier of a second mobile device on which the particular application is to be installed, and a user identifier of an account maintained at the external computing device.

17. A system for transferring software applications between mobile devices comprising:
- a first mobile device comprising a display screen; a second mobile device;
- a computing device;
- a communication interface that enables the first mobile device and the second mobile device to communicate with the computing device;
- the computing device having a processor in communication with a memory having a set of instructions located therein, the processor operable to execute the set of instructions which cause the processor to:
  - trigger the machine first mobile device to:
    - capture an image of the display screen of the first mobile device with at least one application selection icon visible within the image; and
    - transmit the image of the display screen to computing device;
  - receive the image of a first the display screen of the first mobile device;
  - analyze the image to identify at least one software application from the at least one selection icon by at least:
    - accessing a database of known selection icons;
    - comparing each application selection icon represented within the image with the known selection icons; and
    - in response to an application selection icon from the image matching one of the known selection icons, placing an application identifier within a list of application identifiers for applications that are present on the first mobile device, wherein the list of applications indicate applications that should be installed on the second mobile device; and
  - initiate a download of the at least one application to a second mobile device for installation of the at least one application on the second mobile device.

18. The system of claim 17, wherein the set of instructions further comprise instructions that cause the processor to:
- trigger the first mobile device to capture a settings screen image associated with a particular application that has a selection icon present within the at least one selection icon visible in the image;
- identify from the settings screen image at least one setting parameter value associated with the first application at the first mobile device; and
- in response to (a) completion of a download of the particular application to the second mobile device and (b) the settings screen image containing the at least one setting parameter value, forwarding the at least one setting parameter value to the second mobile device to trigger the second mobile device to populate a corresponding settings field of the particular application installed at the second mobile device with the at least one setting parameter value.

19. The system of claim 18, wherein the set of instructions that cause the processor to identify the at least one setting parameter value from the settings screen image further comprise instructions that cause the first processor to:
- access a stored settings page corresponding to the particular application from a database linking applications with respective settings pages;
- identify a location of one or more of the setting fields within the stored settings page in which settings parameter values are provided; and
- perform a character-based recognition of alphanumeric and other character contents that are present in similarly-located setting fields of the settings screen image to identify the settings parameter values of the particular application.

20. The system of claim 17, wherein the set of instructions further comprise instructions that cause the processor to:
- receive a general settings screen image associated with the first mobile device with at least one general settings field including a general settings value utilized at the first mobile device;
- associate a corresponding settings field of the second mobile device with the at least one general settings field;
- pair the corresponding settings field with the general settings value; and
- store the settings field-general settings value pairing for utilization during setup of the corresponding settings field on the second mobile device.

* * * * *